May 21, 1929.    G. A. MEEK    1,714,392
TIRE VALVE
Filed Nov. 25, 1925
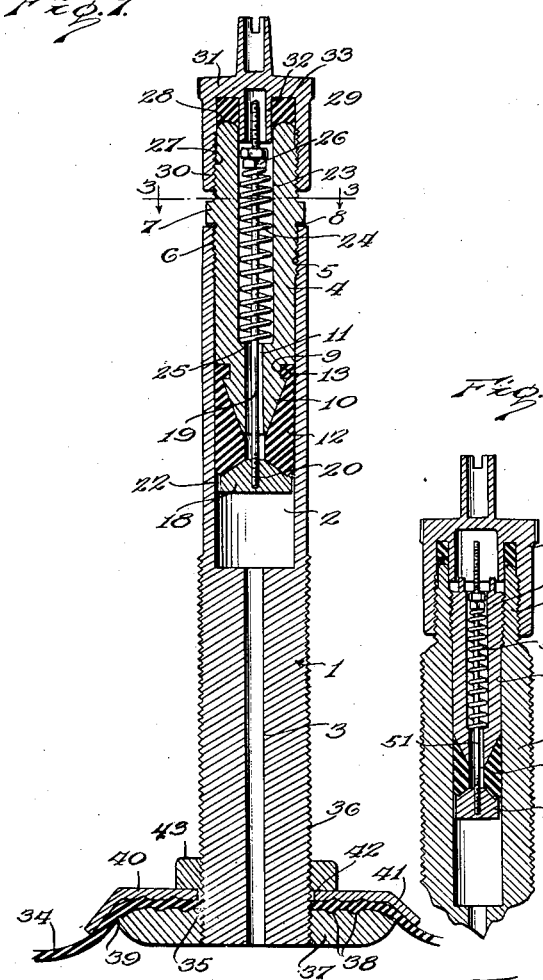
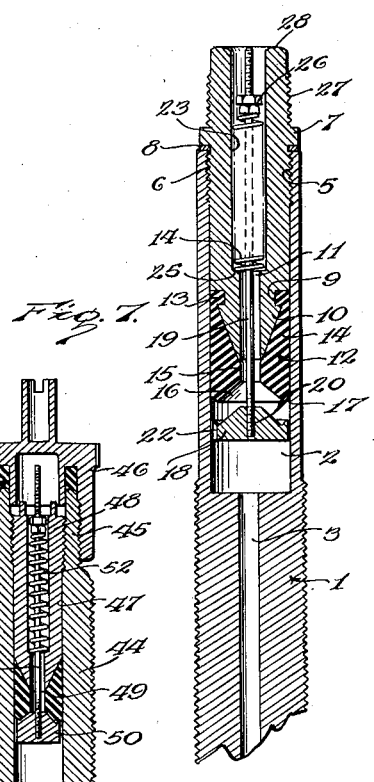
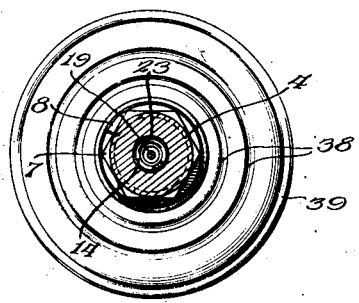
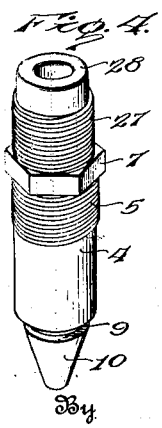
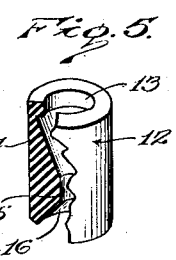
Inventor
G. A. Meek
By
Attorneys Patented May 21, 1929.

1,714,392

UNITED STATES PATENT OFFICE.

GEORGE A. MEEK, OF LEON, IOWA.

TIRE VALVE.

Application filed November 25, 1925. Serial No. 71,476.

This invention relates to improvements in tire valves and has as its general object to overcome disadvantages which attend the use of tire valves of the ordinary type. It is a well known fact that tire valves, as ordinarily constructed, are subject to leakage, particularly after they have been in use for any considerable period of time. This is due chiefly to the fact that the valve seat has a rubber seating surface which is of extremely small area, and the valve body is of substantially conical form and has a relatively sharp edge at its end which engages the seat and which edge soon cuts into the rubber seating surface, thereby permitting the leakage of air past the valve. Therefore, it is one of the objects of the present invention to provide a valve in which the valve seat and the head of the valve are so formed or are of such contour that there will be no liability of cutting of the seat or any appreciable wear thereon, even after an exceptionally long period of use.

Another object of the invention is to so construct the valve and its seat that the pressure exerted by the valve head against the seat, due to the pressure of the air within the inflated tire, will effect an expansion of the seat circumferentially against the wall of the valve casing, thereby not only precluding any escape of air between the valve and its seat but also precluding any escape of air between the valve body of which the seat constitutes a part, and the wall of the valve casing.

Another object of the invention is to so construct the valve head and its seat that the said head will have wedging engagement with the seat, thereby insuring of a snug and absolutely air-tight fit between the parts without any liability of mutilation of the seat such as occurs where the valve head has a sharp edge engaging the seat.

Another object of the invention is to so construct the valve that any foreign particles which might enter the valve will not be permitted to remain between the head of the valve and the valve seat but will, on the other hand, be permitted to pass into the inner tube where they can cause no damage, whereas, in the ordinary constructions of tire valves, such foreign particles are practically certain to lodge upon the valve seat and result in cutting or wearing away of the seat or mutilation thereof.

Another object of the invention is to so construct the valve that there will be no liability of disarrangement of its component parts and no liability of the valve head failing to properly snugly engage its seat in an air-tight manner when the valve stem is pressed inwardly to permit of deflation of the inner tube either partially or wholly.

Another object of the invention is to so construct the valve seat that contact of the valve head with the metallic supporting bushing for the seat cannot take place under any circumstances so that leakage of air because of metal to metal contact between the valve head and seat cannot occur.

Another object of the invention is to provide a tire valve constructed of a minimum number of parts which may be readily assembled and as readily disassembled if occasion should require, in the latter instance.

In the accompanying drawings:

Figure 1 is a vertical sectional view through a tire valve constructed in accordance with the present invention.

Figure 2 is a similar view illustrating the valve pressed inwardly to unseating position.

Figure 3 is a transverse sectional view taken substantialy on the line 3—3 of Figure 1, looking in the direction indicated by the arrows.

Figure 4 is a perspective view of the bushing which supports the valve seat.

Figure 5 is a sectional perspective view of the valve seat.

Figure 6 is a perspective view of the valve head.

Figure 7 is a sectional view illustrating a modification.

The valve comprises a valve casing which is indicated in general by the numeral 1 and which is of the usual tubular form, the casing being provided throughout substantially the upper half of its length with a bore 2 which is of relatively large diameter, and throughout the remainder of its length with a bore 3 of smaller diameter. The numeral 4 indicates a bushing which is exteriorly threaded for a portion of its length as indicated by the numeral 5, and below its threaded portion is exteriorly cylindrical, and this bushing is fitted into the upper end of the bore 2, the said bore being interiorly threaded as at 6, to accommodate the threaded portion of the bushing, and the said bushing being provided above its threaded portion with a polygonal portion 7 for the application of a small wrench or a pair of pliers, whereby it may be securely threaded into place in the casing. In order to effectually prevent backward rotation of the bushing 4, as for example when the cap of the valve casing is removed, it is preferable that a lock washer 8 be interposed between the under side of the polygonal portion 7 of the bushing and the upper end of the casing 1.

At its lower end, the body of the bushing 4 is formed with a circumscribing groove or channel 9 preferably having straight walls, and below this channel or groove, the said body of the bushing is gradually reduced in diameter or tapered to provide a conical gasket supporting head indicated by the numeral 10. The body of the bushing is formed axially with an opening 11 to accommodate the valve stem, as will presently be explained, and this bore 11, at its lower end, is of relatively small diameter and opens through the lower or minor end of the said gasket supporting head 10. The gasket is indicated by the numeral 12 and constitutes the seat of the valve, and the said gasket is preferably made of soft rubber, the degree of softness being such that the gasket may be readily compressed and will be capable of expansion circumferentially when pressure is exerted against it endwise. Exteriorly, the gasket is of cylindrical form and the said gasket is hollow, the inner surface of its wall at its upper end being provided with an inwardly projecting annular rib 13 which seats firmly in the groove 9 in the body of the bushing 4. From the under side of the rib 13, the gasket is interiorly gradually reduced in diameter to provide a substantially conical portion 14 which snugly embraces and fits the gasket supporting head 10 of the bushing, this conical portion being of a length equal substantially to the length of the head 10. Interiorly, the gasket is of cylindrical form below the tapered interior portion 14, as indicated by the numeral 15, and this portion is of a diameter substantially the same as or slightly more than the diameter of the bore 11 of the bushing 4. In its lower end, the gasket is formed interiorly with a conical seat 16 which is comparatively shallow, and exteriorly the gasket body at its lower end is slightly beveled as indicated by the numeral 17. The conical portion 16 of the gasket constitutes the seat for the valve head and by reference to Figures 1 and 2 of the drawings, it will be observed that the gasket is exteriorly of a diameter to snugly fit within the bore 2 of the valve casing and that due to the engagement of the rib 13 in the groove 9, the gasket is securely held assembled with the bushing 4 so that it may be inserted with the bushing into the casing and removed therefrom without any likelihood of separation of the two parts.

The valve proper comprises a head 18 and a stem indicated by the numeral 19, which stem is connected at its lower end to the head 18 in any suitable manner as for example, by forming a threaded socket 20 in the head opening through the upper side thereof and threading the lower end of the stem into said socket, it being observed that the socket does not extend entirely through the head, so that there can be no liability of escape of air at this point. The head comprises a circular body which has a flat under side and which at its upper side is of frusto conical form, the said frusto conical upper portion of the body being so proportioned and of such contour that it will snugly contact the wall 16 of the valve seat 12 when the valve head is seated, as shown in Figure 1, the upper end of the conical portion at such time completely closing the restricted portion 15 of the bore of the valve seat, as clearly shown in the said figure. The valve head is provided at its periphery with an upstanding circumscribing flange 21 which is relatively shallow and the outer side of which is flush with the circumferential surface of the body of the valve head, the inner side of the flange being beveled, as clearly shown in Figures 1, 2 and 6 of the drawings. It will be observed that the beveled inner side 21 of the flange opposes the conical surface of the upper portion of the valve head and that the said beveled inner side of the said flange 21 snugly fits the beveled surface portion 17 of the valve seat, when the valve is closed. In order to provide for the discharge, through the valve casing, of any forign particles which might enter the casing at the time of inflation of the tire, or at any other time, the periphery of the valve head is formed with a plurality of vertical grooves or passages 22 and it will be evident that inasmuch as these passages, at their upper ends, terminate substantially at the lower perimeter of the conical upper portion of the valve head, any foreign particles entering the valve casing and reaching the upper side of the head, will not rest thereon but will move downwardly over the surface of the head and through the passages 22, and will fall into the lower end of the valve casing and eventually enter the inner tube, where they can do no damage. It will be evident from Figures 1 and 2 of the drawings, that the valve head is of slightly less diameter than the internal diameter of the bore 2, so that air may readily pass about the valve head when the valve is opened. The valve stem 19 extends upwardly through the bore 11 and upwardly into an enlargement 23 of said bore, and a compression spring 24 is disposed upon the upper portion of the valve stem and bears at its lower end against the shoulder 25 which is formed at the juncture of the upper end of the bore 11 with the lower end of the enlargement 23 thereof and at its upper end bears against one of a pair of nuts 26 which are threaded onto the upper end of the said stem, it being understood that the spring 24 possesses sufficient strength to normally hold the valve head to its seat.

It will be evident at this point that due to the conical form of the upper side of the valve head 18, and the conical form of the surface 16, and likewise due to the fact that the valve seat is formed of rubber which is of such degree of softness as to be readily compressible and expansible, and highly elastic, the air pressure against the under side of the head will result in the upper side of the valve head being forced against the seat 16 in the manner of a wedge with the result that the valve seat body is compressed in the direction of its length and, due to the qualities possessed by the rubber of which it is formed, it will be circumferentially expanded so as to bind firmly against the wall of the bore 2 of the valve casing, thereby positively precluding any leakage of air past the seat, either between the said seat and the wall of the bore or between the valve head and the seat. As a consequence, a tire equipped with the valve will remain inflated for an indefinite period of time, whereas tires equipped with the present types of valves requires to be frequently inflated, due to leakage of air past the valves.

It will also be evident from an inspection of the drawings and from the foregoing description of the invention, that while the valve head has, in a sense, a wedging fit against the seating surface 16, nevertheless, the inclination of the seat-engaging surface of the valve head and the inclination of the surface 16 of the seat is sufficiently gradual to preclude any possibility of the valve head sticking to the seat, so that when it is required to partially or wholly deflate the tire, no difficulty will be experienced in forcing the valve stem inwardly to unseat the valve.

Above its polygonal portion 7, the bushing 4 of the valve is exteriorly threaded, as indicated by the numeral 27, and the upper end of the wall of the bushing is rounded in cross section as indicated by the numeral 28. The numeral 29 indicates a casing cap which is interiorly threaded as at 30, to adapt it to be removably fitted to the threaded upper end of the bushing, and the cap is provided upon the under side of its top 31 with a depending tubular member 32 exteriorly of a diameter to fit within the upper end of the bore 23 of the bushing 4 when the cap is applied to the bushing. A gasket 33 is disposed within the upper portion of the cap 29 and snugly fitted about the member 32, and when the cap is tightened upon the upper end of the bushing, this gasket will, at its under side, contact the rounded upper edge of the wall of the bushing, as clearly shown in Figure 1 of the drawings, so as to provide against the leakage of air at this point, although, as previously stated, there is no likelihood of air leaking past the valve and its seat. It will be evident at this point that the threaded upper end portion of the bushing 4 takes the place of the integral threaded upper end portion of the casing of a tire valve of the ordinary type and it will likewise be evident that by providing the casing with the bore 2 which is of relatively large diameter, the parts of the valve may be formed of greater dimensions than is possible in the ordinary valve, where the casing has a bore, corresponding to the bore 2, of relatively small diameter and where the casing is exteriorly reduced and threaded at its upper end to accommodate the casing cap. Therefore, the valve seat and valve of my invention may be made of larger dimensions and, therefore, more substantial and effective than the corresponding parts of a valve of the ordinary type.

In Figure 1, the inner tube, with which the valve embodying the invention is assembled, is indicated by the numeral 34, and is provided with the usual opening 35 to accommodate the inner or lower end of the valve casing 1, the said casing being exteriorly threaded throughout its lower portion, as indicated by the numeral 36, so that the usual dust cap bushing, (not shown) may be applied thereto, the threads extending to the extreme lower end of the casing. The numeral 37 indicates a circular base member which is threaded onto the lower end of the casing 1 and either soldered, brazed or welded thereto so as to constitute an integral part therewith, the upper side of the said base being provided with the usual concentric annular corrugations 38 and the periphery of the base at the upper side thereof being provided with an outstanding relatively shallow circumferential bead 39, these corrugations and the bead being designed to engage the inner side of the tire tube 34 when the casing is fitted through the opening 35. The numeral 40 indicates the usual clamping plate which has the side flanges 41 and a central opening 42 to accommodate the valve casing, and clamp the same therebetween and the base 37, the usual nut 43 being threaded onto the lower end portion of the casing to bear against the upper side of the said clamping plate 40 and thus draw the parts together. It will be observed that the rib 39 engages the tire tube 34 at a point opposite the flanges 41 and thus serve to more securely anchor the casing to the tube.

In the embodiment shown in Figure 7 of the drawings, the valve structure is substantially the same as in the embodiment previously described, the valve casing being indicated by the numeral 44 and being of substantially the construction of the ordinary valve casing. That is to say, it is provided at its upper end portion with a reduced exteriorly threaded portion 45 to which is fitted a cap 46 corresponding to the cap 29 previously described. In this embodiment, the bushing which is indicated by the numeral 47 and which corresponds to the bushing 4, has a threaded upper portion 48 corresponding to the threaded portion 5 of the bushing 4 and which is fitted into the upper end of the bore of the casing 44, the valve parts comprising the seat 49, valve head 50, stem 51, and holding spring 52, being carried by the bushing and all corresponding to the like parts of the embodiment of the invention shown in Figures 1 to 6 inclusive. In this particular embodiment, the groove 9 in the bushing 4 of the previously described form as well as the rib 13 of the valve seat 12 may be omitted.

Referring further to the valve seat 12, the valve, and the supporting head for the valve seat, which head constitutes a part of the bushing 4, it will be evident that the taper of the head 10 and of the upper side of the valve head is such that the minor ends of the heads oppose each other and, therefore, when upward pressure is exerted against the valve head by the compressed air within the tire tube, the thicker wall portion of the valve seat is compressed between two oppositely inclined or conical surfaces, thereby effecting a maximum expansion of the seat against the wall of the bore 2.

Having thus described the invention, what I claim is:

A tire valve comprising a tubular casing, a bushing secured in the outer end of the casing and having an axial air passage, an inwardly tapered head projecting axially from the inner end of the bushing, the air passage being extended through said head, an elongated gasket of elastic material carried by said head and having a cylindrical exterior whereby it may fit closely from end to end within the casing, the bore of the gasket being deeply flared at its upper end to encircle the tapered head of the bushing and having a shallow flared seat at its lower end with a straight air passage connecting said flared portions, a valve head within the bore of the casing at the inner end of the gasket having a shallow conical outer side presented to and engageable within the flared inner end of the gasket, a stem secured in the valve head and extending outwardly therefrom through the air passages in the gasket and the bushing, and means acting upon the outer portion of the stem to draw the valve head outwardly whereby the gasket will be compressed longitudinally and expanded radially to effect sealing engagement between the gasket and the wall of the casing and between the gasket and the heads on the bushing and the valve respectively, the lower end of the gasket being beveled externally and the valve head being provided on its upper side with a peripheral flange engaging the bevel on the gasket and being further provided in its periphery with grooves opening through its top and bottom.

In testimony whereof I affix my signature.

GEORGE A. MEEK. [L. S.]